United States Patent
Rieth

(10) Patent No.: US 8,769,798 B2
(45) Date of Patent: Jul. 8, 2014

(54) TUBE FITTING ASSEMBLY

(76) Inventor: Patrick Rieth, Hammond, LA (US)

(*) Notice: Subject to any disclaimer, the term of this patent is extended or adjusted under 35 U.S.C. 154(b) by 435 days.

(21) Appl. No.: 13/068,391

(22) Filed: May 10, 2011

(65) Prior Publication Data

US 2012/0284998 A1    Nov. 15, 2012

(51) Int. Cl.
   *B23P 11/00*    (2006.01)
(52) U.S. Cl.
   USPC ............................................ 29/525.02
(58) Field of Classification Search
   USPC ......... 29/525.01, 525.02, 505, 469, 506, 516, 29/522.1, 282; 285/331
   See application file for complete search history.

(56) References Cited

U.S. PATENT DOCUMENTS

2012/0228872 A1* 9/2012 Gamache .................... 285/331

* cited by examiner

*Primary Examiner* — John C Hong
(74) *Attorney, Agent, or Firm* — Keaty Law Firm LLC

(57) ABSTRACT

A tube fitting for sealing an end of a tube uses a notch formed in the exterior surface of the tube as a sealing seat. An internally threaded body is configured to receive an externally threaded end of a nut, while the body and the nut are mounted in a surrounding relationship to the tube end. A ferrule mounted between the nut and the tube is forced to plastically deform and move into the notch to thereby seal the tube end.

3 Claims, 2 Drawing Sheets

TUBE FITTING ASSEMBLY

BACKGROUND OF THE INVENTION

This invention relates generally to the sealing of fittings about tubes and, more particularly, though not exclusively, to the sealing of tubing using a single tube gripping member, such as a ferrule.

Tube fittings are used to join or connect a tube end to another member, whether that other member be another tube end or a device in fluid communication with the tube end. Generally, tube fittings are designed to withstand operational conditions of the environment where the tube is located, such as pressure, vacuum, pull-out pressure, temperature, pulsation and/or vibration. Ideally, a tube fitting grips the tube end so as to prevent loss of seal between the tube and another member. A good tube fitting maintains a leak-free connection between the tube and another member.

Some tube fittings are designed to be used with plastic tubes, while others—with metal tubing, such as stainless steel pipes/tubes. While the design criteria for these applications may differ, the basic concepts of this invention may be applicable to both. Typically, stainless steel and other metal tubing is used for high pressure applications in which the tubing wall thickness is substantial. Such heavy wall tubing is difficult to grip because it is not only hard but it is also resistive to deformation. Such physical characteristics make it more difficult to deform the tubing plastically so as to achieve a desired tube grip.

Tube fittings usually include an assembly of a tube gripping device, which can be a single or double ferrule, and a pull-up member for causing the tube gripping device to be installed on a tube end so as to grip the tube end and create a leak-free seal. The pull-up member can be a threaded nut that is tightly engaged with the body of a member, to which the tubing is connected. The pull up mechanism most commonly used is a threaded connection of a female threaded nut and a male threaded body component, both of which act upon the ferrule as the nut and the body are threaded together. In such arrangement, the front end of the ferrule is sandwiched between the tube and the body to form a sealing member.

Conventional single ferrule fittings are inserted into a space between an outer surface of the tubing and an inner surface of the body. The body is formed with a frustoconical camming surface, which a front end of the ferrule contacts. In many known fitting assemblies, the resulting seal is less than adequate, requiring one or more elastomeric seals to prevent leakage of the liquid or gas.

The present invention contemplates elimination of drawbacks associated with convention tube fitting and provision of a single ferrule seal assembly that effectively seals the interface between the end of the tubing and a body.

SUMMARY OF THE INVENTION

It is, therefore, an object of the present invention to provide a ferrule seal assembly that meets high performance characteristics without compromising overall fitting integrity and leak-proof performance.

It is another object of the invention to provide a ferrule seal assembly that is designed for use in high-pressure, vibration, pulsation and other applications.

It is a further object of the invention to provide a ferrule seal assembly that employs a single ferrule.

These and other objects of the invention are achieved through a provision of a tube fitting assembly, which comprises a cylindrical tube having an exterior surface, a longitudinal axis and a tube end. The tube has a circumferential notch formed in the exterior surface adjacent the tube end. The notch is defined by a curved surface and a transverse surface, which extends substantially perpendicularly to the longitudinal axis of the tube.

The fitting assembly also comprises a first tube fitting member having an inner bore and an internally threaded end, said first tube fitting member being configured to receive the tube within the inner bore. A second tube fitting member has a central aperture extending through a length thereof, the second fitting member comprising an externally threaded end. A tube gripping member is mounted for sliding movement along exterior surface of the tube. The tube gripping member has a tapered front end configured to fit into the notch, when the second tube fitting member is pulled up, and seal the tube end.

The first tube fitting member can be a valve component, a conduit, a manifold or any other device. The second tube fitting member is an externally threaded nut that partially fits into the bore of the first tubing member when pulled up. The tube gripping member is a single ferrule with sufficient plasticity allowing the front end of it to be deformed while being fitted into the notch. The flexing ability of the ferrule allows a partial bending of the ferrule sealing portion, which moves into a sealing contact with the tube end.

The notch on the tube body is partially defined by a curved or arcuate exterior surface of the tube. An arcuate camming surface is formed opposite the tube arcuate surface along the inner bore of the body, or the first tube fitting member. A space is defined between the arcuate surfaces of the tube and the body, and the tube gripping member, or ferrule fits tightly into said space when forced into a sealing position by the pulling up of the externally threaded nut.

BRIEF DESCRIPTION OF THE DRAWINGS

Reference will now be made to the drawings, wherein like parts are designated by like numerals, and wherein.

DETAIL DESCRIPTION OF THE INVENTION

Turning now to the drawings in more detail, numeral 10 designates the ferrule seal assembly of the present invention. The assembly forms a tube fitting, which comprises a male threaded nut 12, a female threaded body 14 and a tube gripping member, or ferrule 16. The body 14 forms a first tube fitting member, and the nut 12 forms the second tube fitting member. It will be understood that the body 14 does not have to be a separate component but may be attached to or otherwise integral to another device, for instance a valve body, manifold or other components. In one aspect of the invention, the assembly also comprises a specially designed tube with an external notch for receiving the ring-shaped ferrule 16 in a sealing engagement with the end of a tube, as discussed below.

Figure 1:
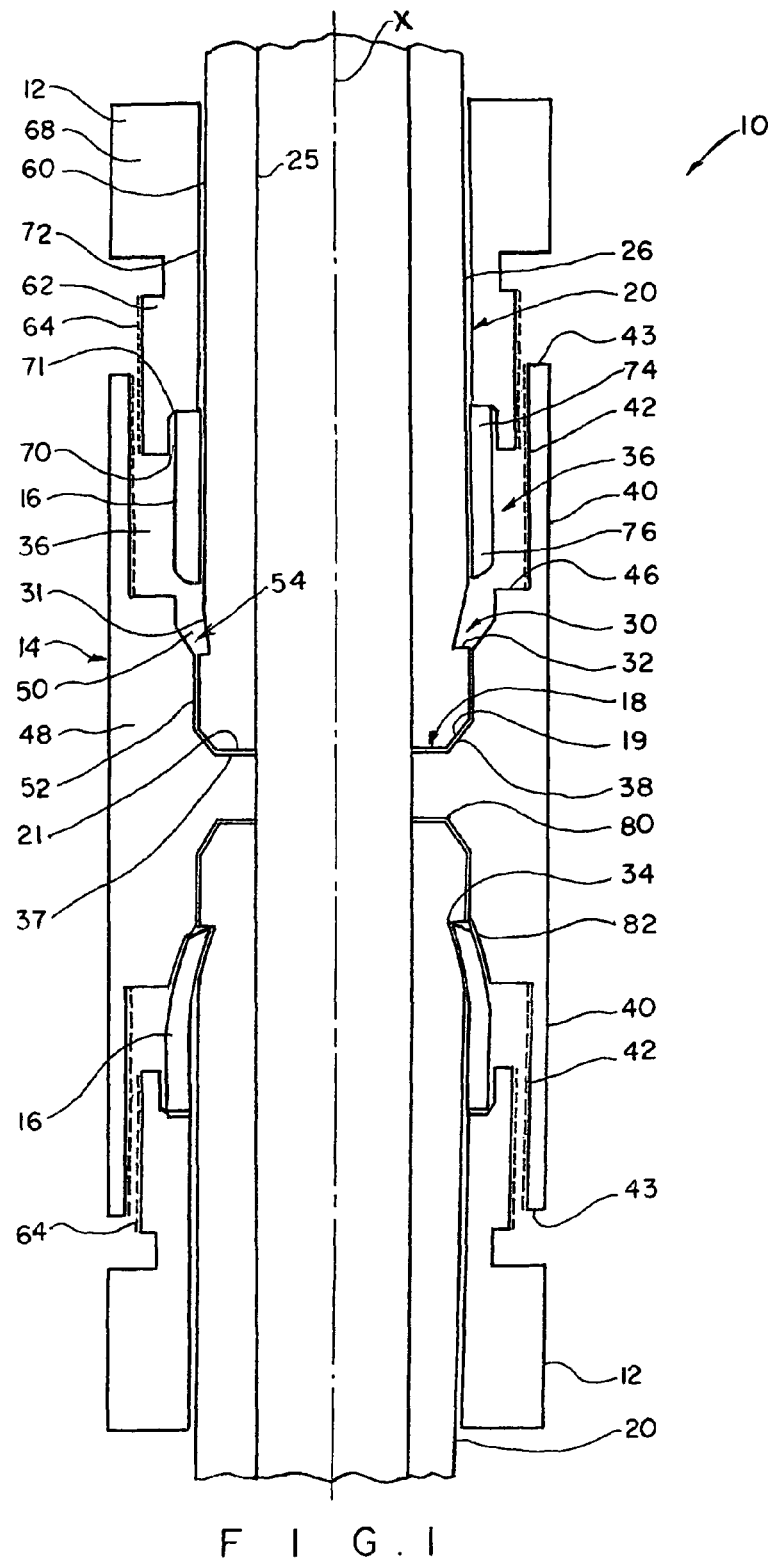
FIG. 1 is a sectional view illustrating the tube fitting assembly of the present invention with the tube end having an outer conical surface.

The assembly 10 is configured for mounting on an end 18 of a tube 20. In the embodiment of FIG. 1, the end 18 of the tube 20 has a frustoconical configuration with an angled surface 19 and a straight transverse surface 21. The straight surface 21 extends at a right angle to a normal longitudinal axis X of the tube 20, while the angled surface 19 extends at an obtuse angle in relation to the straight surface 21. The tube 20 has a generally cylindrical configuration with a central opening 24, through which a liquid or gas is transported. The tube 20 has an inner wall 25 and an exterior wall 26.

A circumferential notch 30 is formed in the exterior wall 26 of the tube 20 a distance from the end 18 of the tube 20. The notch 30 is defined by a first curved part 31 and a first transverse shoulder 32, which is oriented at about 90-degree angle to the longitudinal axis X of the tube 20 and generally parallel to the straight surface 21 of the end 18. A sealing point 34 is formed at the intersection of the curved part 31 and the first transverse shoulder 32, as will be explained in more detail hereinafter. The curved or arcuate part 31 forms a contact surface for the ferrule 16.

The body 14 has a generally cylindrical configuration with a central longitudinal bore 36 that is sized and shaped to closely and slidably receive the tube end 18. To accommodate the frustoconical end 18, the bore 36 has a straight surface 37 and an angled surface 38, which matches the angle surface 19 of the tube end 18. The length of the straight surface 37 of the body 14 is slightly smaller than the length of the straight surface 21 of the tube 18, such that the tube end 18 can tightly fit into the bore 36 as shown in FIG. 1.

The body 14 comprises a threaded portion 40 provided with internal threads 42. The body internal threads 42 extend from an edge 43 of the threaded portion 40 to approximately an internal shoulder 46 formed in the central bore 36. The internal shoulder 46 extends substantially in parallel to the straight surface 37 of the bore 36 and the straight surface 21 of the tube end 18.

The bore 36 is provided with a reduced diameter bore portion 48, which is formed between the angled surface 19 and the threaded portion 40. The reduced diameter bore portion 48 is defined by a curved body part 50 of the inner wall of the body 14 and a cylindrical body part 52, which extends between the curved body part 50 and the angled surface 38 of the central bore 36. The curved or arcuate body part 50 forms a camming surface. The diameter of the curve of the curved body part 50 can be similar to the diameter of the curvature of the first curved part 31 of the tube notch 30, although it is not absolutely necessary. As can be seen in FIG. 1, the curved body part 50 is spaced from the first curved part of the tube notch 30. The created space 54 is configured to receive the ferrule 16, as will be explained below.

The nut 12 comprises a generally cylindrical body having a central aperture 60 sized and shaped to allow the nut 12 to be slidably engaged with the tube 20. The nut 12 has a threaded portion 62 carrying external threads 64, which match the internal threads 42 of the end 40 of the body 14 allowing the nut 12 to be threadably engaged with the body 14 when gripping the tube 20. A non-threaded end 68 of the nut 12 can be formed with a wrench-engageable hexagonal or other similar exterior surface to allow tightening or pulling up of the nut 12.

A cutout 70 is formed in an inner wall 72 of the nut 12. The cutout 70 has a generally rectangular configuration to accommodate a back end 74 of the ferrule 16. A nut inner shoulder 71 is defined in the cutout 70, the nut inner shoulder extending transversely to the longitudinal axis of the nut 12 and to the axis X of the tube 20. The nut inner shoulder 71 contacts a back end 74 of the ferrule 16 and forms a drive shoulder for the ferrule when the nut is pulled up and tightened against the body 14. As can be seen in the drawings, the ferrule 16 has a generally cylindrical body having an inner diameter slightly greater than an external diameter of the tube 20. The ferrule slides along the outer wall of the tube 20 in and out of sealing engagement therewith. A front end 76 of the ferrule 16 has a slightly tapered configuration to fit into the notch 30 formed on the exterior wall of the tube 20.

In order to achieve a fluid-tight seal and tube gripping action, the ferrule 16 is designed to be plastically deformed when forced into the notch 30 of the tube 20 during a pull-up, as illustrated in a lower part of FIG. 1. This result is achieved by designing the ferrule 16 to have plasticity and resiliency allowing the nose end 76 of the ferrule to be bent in relation to the back end 74.

When the nut 12 is pulled up while being threadably engaged with the body 14, the ferrule 16 is forced to move axially in the direction of the notch 30 by the nut inner shoulder 71. As the ferrule slides along the external wall 26 of the tube 20, particularly along the first curved part 31 of the notch 30, the front end 76 of the ferrule 16 gradually bends towards the tube 20 until it bottoms into the notch 30, as shown in the lower part of FIG. 1. The ferrule flexes between a sealing position in the circumferential notch 30 and an unseated position when the nut 12 is disengaged or released from engagement with the body 14.

In conventional tube fitting assemblies, a seal is formed in the annular area around the tube end 18 where it comes into contact with the surface 37, 38 of the of the body 14. This area is schematically designated by numeral 80 in FIG. 1. When the assembly 10 is used, there created two additional sealing areas—the annular area 34 and the annular area 82 shown in dark in FIG. 1. In this way, the tip of the front end of the ferrule 16 seals against the intersection of the walls 31, 32 defining the notch 30, while the outer edge of the front end of the ferrule 16 seals against the curved body part 50. The ferrule seal assembly this forms an exceptionally strong mechanical resistance to vibrations, pulsation or pressure tending to break connection between the body and the tube. The embedded front end 76 of the ferrule 16 provides both an excellent seal and a strong grip on the tube end 18.

Figure 2:
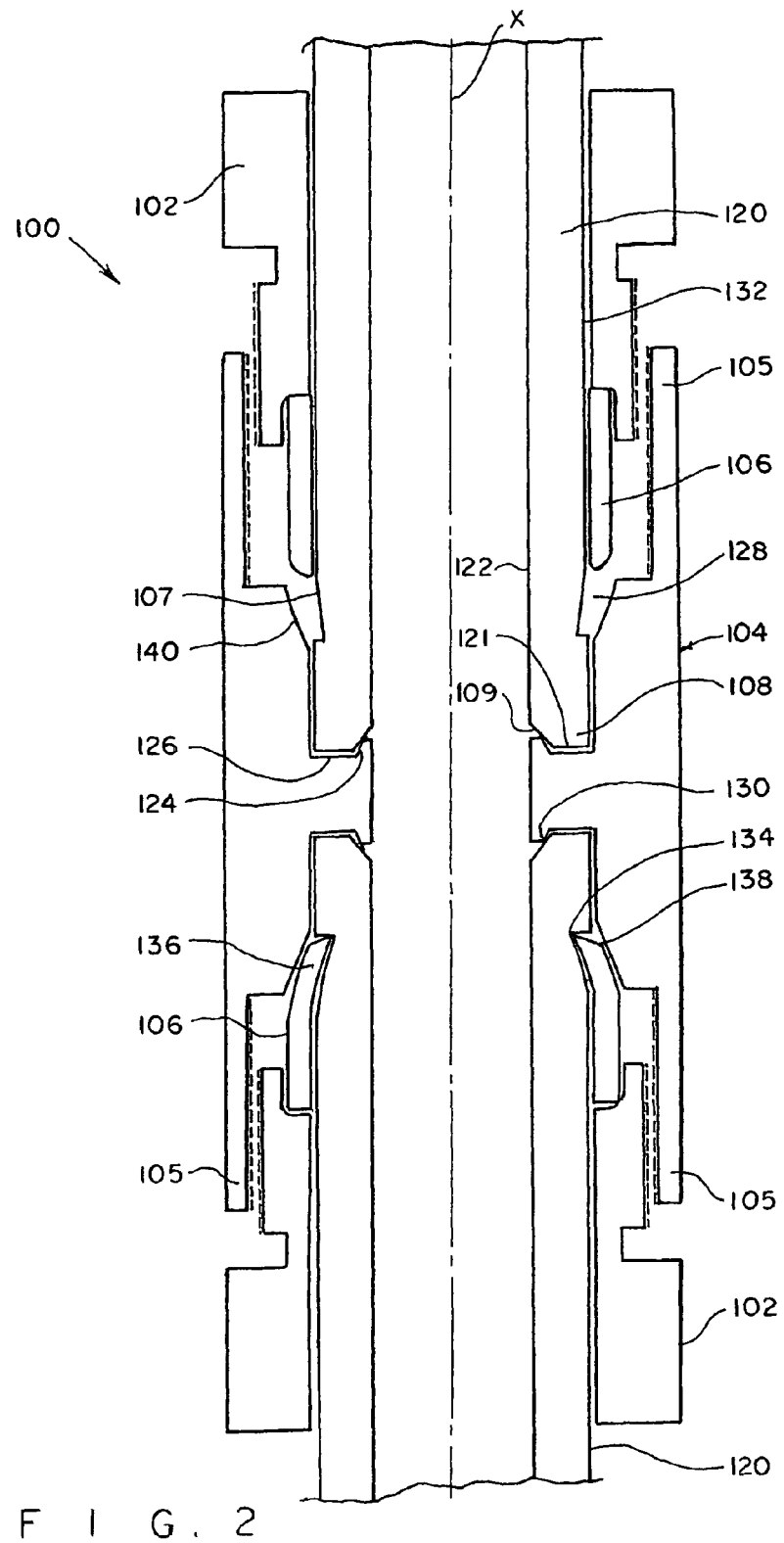
FIG. 2 is a sectional view illustrating the tube fitting assembly of the present invention with the tube end having an inner conical surface.

Turning now to the embodiment of FIG. 2, a ferrule seal assembly 100 is shown to comprise an externally threaded nut 102, an internally threaded body 104 and a slidable tube gripping member, or ferrule 106. Similarly to the embodiment of FIG. 1, the assembly 100 forms a tube fitting, which can be used in a variety of situations involving high pressure, vacuum, pull-out or burst pressure, vibrations, impulse, pulsations and the like. It will be understood that the body 104 does not have to be a separate component but may be attached to or otherwise integral to another device, for instance a valve body, manifold or other components. In one aspect, a special tube 120 with a notch formed adjacent the tube end is provided as well.

The assembly 100 is configured for mounting on an end 108 of the tube 120. In the embodiment of FIG. 2, the end 108 of the tube 20 has a frustoconical configuration with an angled surface 109 formed on an inner wall 122 of the tube 120. A straight transverse surface 121 extends at a right angle to a normal longitudinal axis X of the tube 120, while the angled surface 109 extends at an obtuse angle in relation to the straight surface 121. The tube 20 has a generally cylindrical configuration with a central opening 24, through which a liquid or gas is transported.

A matching bore is formed in the cylindrical body 102 to accommodate the end 108 of the tube 120. A body angular surface 124 extends generally in parallel to the angular surface 121 of the tube end 108, while the body straight surface 126 extends transversely to the longitudinal axis X of the tube 120 and in parallel to the straight transverse surface 121 of the tube 120.

In this embodiment, similarly to the embodiment shown in FIG. 1, the upper part of the drawing illustrates the tube gripping assembly in an unseated position, while the lower part illustrates the tube gripping assembly, of ferrule sealing assembly in a sealing engagement with the tube 120. Normally, with the tube ends having inwardly directed frustoconical ends, a sealing area is defined at the contact point 130 between the angular surfaces 109 and 124. With the present invention, two additional sealing areas are formed when the ferrule 106 is forced into a notch 128 formed in an exterior wall 132 of the tube 120.

The other features of the embodiment shown in FIG. 2 are very much similar to the features of the assembly illustrated in FIG. 1. Similarly to the above described embodiment, the cylindrical ferrule 106 is forced into the notch 128 when the nut 102 is gradually threadably engaged with a threaded end 105 of the body 104. The nut 102 forces the ferrule 106 to move along the exterior surface 132 of the tube 120 and, as the ferrule passes the curved or arcuate part 107, to gradually deform, bending toward the tube 120 until the ferrule 106 fits into the notch 128.

Then an annular sealing area 134 is formed between a tapered front tip 136 of the ferrule 106 and the notch 128. A second annular sealing area 138 is formed around an outer edge of the front end of the ferrule 106 and a curved or arcuate camming surface 140 of the body inner wall. The camming surface 140 may or may not be parallel to the arcuate surface 107 defining the notch 108.

In one aspect of the invention, the body 14 may be used to seal two separate tube ends, such as in a coupling connecting two tubular members, as shown in FIGS. 1 and 2. For illustrative purposes, each of the drawings illustrates the tube gripping member in an unseated positioned and in a sealing position. It will be understood though that both ring-shaped ferrules may be positioned in a sealing arrangement with the tube ends or unseated position, depending on the operation of the equipment, where the tube fitting assemblies 10 and 100 are mounted.

In accordance with this invention, an efficient tube fitting is provided using a single ferrule seal assembly. As the single ferrule acts against the curved camming surface of a female threaded body, the ferrule forms additional annular seals at the front end of the ferrule. The features of this invention are particularly advantageous when the tube has high hardness characteristics and biting techniques, when the ferrule bites into the tube, are difficult to apply.

The components of the ferrule sealing assembly can be made of a non-corrosive material such as stainless steel, although identification of the material is intended to be exemplary in nature and should not be construed in a limiting sense. Those skilled in the art will readily appreciate that the invention may be realized using any number of different types of metal materials for the fitting components, as well as metal tubing materials, including ferritic stainless steel, any duplex stainless steel, any nickel alloy, any precipitation hardened stainless steel, brass, copper alloys, any carbon alloy steel or other suitable materials. Furthermore, the ferrule sealing assembly need not be made of the same material as the tubing itself.

Although a number of aspects of the invention are described herein as being incorporated into the exemplary embodiments, such description should not be construed in a limiting sense. For any particular application the various aspects of the invention may be used as required in different combinations and sub-combinations thereof. Furthermore, although the present disclosure describes and/or illustrates a number of design choices and alternative embodiments, such descriptions are not intended to be and should not be construed as an exhaustive list of such choices and alternatives. Many changes and modifications can be made in the present invention without departing from the spirit thereof. I, therefore, pray that my rights to the present invention be limited only by the scope of the appended claims.

I claim:

1. A method of assembling a tube fitting, comprising the steps:
    providing a cylindrical tube having an exterior surface, a longitudinal axis and a tube end, said tube being provided with a notch formed in the exterior surface adjacent the tube end, wherein the notch is defined by a first arcuate surface and a second straight surface extending transversely to the longitudinal axis of the tube;
    providing a first tube fitting member having an inner bore and an internally threaded end;
    providing a second tube fitting member having a central aperture extending through a length thereof, said second fitting member comprising an externally threaded end;
    providing a deformable tube gripping member having a front end;
    positioning the tube gripping member between the second tube fitting member and the tube;
    joining the first tube fitting member with the second tube fitting member such that the front end of the tube gripping member is forced to plastically deform while fitting into the notch and into sealing engagement with the tube end.

2. The method of claim 1, wherein the tube gripping member is mounted for sliding movement along exterior surface of the tube, while the front end deforms upon contact with the first arcuate surface.

3. The method of claim 2, wherein the first tube fitting member comprises an arcuate camming surface located opposite the first arcuate surface, and wherein the front end of the tube gripping member fits between the camming surface and the first arcuate surface.

* * * * *